(12) United States Patent
Raman et al.

(10) Patent No.: US 12,366,386 B2
(45) Date of Patent: Jul. 22, 2025

(54) RADIATIVE COOLING SYSTEMS

(71) Applicant: SkyCool Systems, Inc., Mountain View, CA (US)

(72) Inventors: Aaswath Raman, Los Angeles, CA (US); Eli A. Goldstein, Mountain View, CA (US); Shanhui Fan, Stanford, CA (US)

(73) Assignee: SkyCool Systems, Inc., Mountain View, CA (US)

(*) Notice: Subject to any disclaimer, the term of this patent is extended or adjusted under 35 U.S.C. 154(b) by 34 days.

(21) Appl. No.: 18/500,358

(22) Filed: Nov. 2, 2023

(65) Prior Publication Data
US 2024/0288200 A1 Aug. 29, 2024

Related U.S. Application Data

(63) Continuation of application No. 17/747,340, filed on May 18, 2022, now Pat. No. 11,841,171, which is a
(Continued)

(51) Int. Cl.
F24S 70/225 (2018.01)
B32B 18/00 (2006.01)
(Continued)

(52) U.S. Cl.
CPC ............ *F24S 70/225* (2018.05); *B32B 18/00* (2013.01); *C09K 5/08* (2013.01); *F24S 70/16* (2018.05);
(Continued)

(58) Field of Classification Search
CPC .......... F24S 70/225; F24S 70/16; F24S 70/60; F24S 21/00; B32B 18/00; C09K 5/08; F25B 23/003; F28F 13/18
See application file for complete search history.

(56) References Cited

U.S. PATENT DOCUMENTS 3,154,139 A   10/1964   Hager, Jr.
3,310,102 A   3/1967    Trombe
(Continued)

FOREIGN PATENT DOCUMENTS

CN   103287014 A   9/2013
CN   107883493 A   4/2018
(Continued)

OTHER PUBLICATIONS

3M. "Vikuity™ Enhanced Specular Reflector (ESR)." Vikuity-m Display Enhancement Application Guidelines, 4 pgs. (2003).
(Continued)

*Primary Examiner* — Emmanuel E Duke
(74) *Attorney, Agent, or Firm* — Haley Guiliano LLP

(57) ABSTRACT

A material may be included in a cooling film or cooling panel to achieve cooling even under direct solar irradiation. The material includes one or more constituent materials and an outer surface configured to interact thermally with the atmosphere and with solar radiation. The material exhibits an emissivity of at least 0.8 in spectral range of 5 μm to 15 μm, an ultraviolet reflectivity of at least 0.5 in the spectral range of 275 nm to 375 nm, an ultraviolet absorptivity of at least 0.75 in the spectral range of 275 nm to 375 nm, or a combination thereof. A cooling film, or cooling panel, may be affixed to an exterior surface of a vehicle, structure, or system to provide cooling even under direct solar irradiance.

20 Claims, 11 Drawing Sheets

Related U.S. Application Data continuation of application No. 16/852,132, filed on Apr. 17, 2020, now Pat. No. 11,359,841.

(60) Provisional application No. 62/835,411, filed on Apr. 17, 2019.

(51) Int. Cl.
*C09K 5/08* (2006.01)
*F24S 70/16* (2018.01)
*F24S 70/60* (2018.01)
*F25B 23/00* (2006.01)
*F28F 13/18* (2006.01)

(52) U.S. Cl.
CPC ............ *F24S 70/60* (2018.05); *F25B 23/003* (2013.01); *F28F 13/18* (2013.01)

(56) References Cited

U.S. PATENT DOCUMENTS

| | | |
|---|---|---|
| 4,064,867 A | 12/1977 | Schlesinger |
| 4,128,124 A | 12/1978 | Worthington |
| 4,147,040 A | 4/1979 | Altman |
| 4,323,619 A | 4/1982 | Silvestrini et al. |
| 4,337,990 A | 7/1982 | Fan et al. |
| 4,423,605 A | 1/1984 | Petrick et al. |
| 4,571,952 A | 2/1986 | Greenfield |
| 4,586,350 A | 5/1986 | Berdahl |
| 4,624,113 A | 11/1986 | Hull et al. |
| 5,339,198 A | 8/1994 | Wheatly et al. |
| 5,405,680 A | 4/1995 | Chang et al. |
| 5,811,180 A | 9/1998 | Berdahl |
| 5,830,713 A | 11/1998 | Ferrari et al. |
| 6,262,830 B1 | 7/2001 | Scalora |
| 6,830,713 B2 | 12/2004 | Hebrink et al. |
| 7,105,117 B2 | 9/2006 | Rodgers et al. |
| 7,274,458 B2 | 9/2007 | Perez et al. |
| 7,325,542 B2 | 2/2008 | Mejia |
| 7,503,971 B2 | 3/2009 | Jo |
| 7,901,870 B1 | 3/2011 | Wach |
| 8,012,571 B2 | 9/2011 | Liu et al. |
| 8,182,924 B2 | 5/2012 | Hebrink et al. |
| 8,263,731 B2 | 9/2012 | Liu et al. |
| 8,409,720 B2 | 4/2013 | Hebrink et al. |
| 8,630,040 B2 | 1/2014 | Bright et al. |
| 8,766,385 B2 | 7/2014 | Gidon et al. |
| 8,792,165 B2 | 7/2014 | Merrill et al. |
| 8,846,169 B2 | 9/2014 | McCormick et al. |
| 8,854,730 B2 | 10/2014 | Wang et al. |
| 8,861,072 B2 | 10/2014 | Arsenault et al. |
| 8,879,151 B2 | 11/2014 | Merrill et al. |
| 8,975,011 B2 | 3/2015 | Dunn et al. |
| 8,975,012 B2 | 3/2015 | Dunn et al. |
| 8,982,462 B2 | 3/2015 | Merrill et al. |
| 9,012,044 B2 | 4/2015 | Bright |
| 9,019,607 B2 | 4/2015 | Merrill et al. |
| 9,034,459 B2 | 5/2015 | Condo et al. |
| 9,097,858 B2 | 8/2015 | Merrill |
| 9,291,757 B2 | 3/2016 | Merrill et al. |
| 9,574,783 B2 | 2/2017 | Hollick |
| 9,709,349 B2 | 7/2017 | Raman et al. |
| 9,746,206 B2 | 8/2017 | Yamada et al. |
| 9,927,188 B2 | 3/2018 | Liu et al. |
| 10,060,686 B2 | 8/2018 | Liu et al. |
| 10,131,838 B2 | 11/2018 | Berdahl |
| 10,173,792 B1 | 1/2019 | Burckel |
| 10,273,024 B1 | 4/2019 | Youngquist et al. |
| 10,323,151 B2 | 6/2019 | Van et al. |
| 10,371,416 B2 | 8/2019 | Jin et al. |
| 10,386,097 B2 | 8/2019 | Yu et al. |
| 10,502,505 B2 | 12/2019 | Yang et al. |
| 10,514,215 B2 | 12/2019 | Han et al. |
| 10,584,250 B2 | 3/2020 | Van et al. |
| 10,591,190 B2 | 3/2020 | Yoshihiro et al. |
| 10,698,312 B2 | 6/2020 | Van et al. |
| 10,724,809 B2 | 7/2020 | Yang et al. |
| 10,947,394 B2 | 3/2021 | Xu et al. |
| 11,067,316 B2 | 7/2021 | Shenhav et al. |
| 11,078,593 B2 | 8/2021 | Chen et al. |
| 11,084,943 B2 | 8/2021 | Van et al. |
| 11,084,944 B2 | 8/2021 | Van et al. |
| 11,359,841 B2 | 6/2022 | Raman et al. |
| 2002/0063223 A1 | 5/2002 | Desteese et al. |
| 2003/0030041 A1 | 2/2003 | Genjima et al. |
| 2004/0025931 A1 | 2/2004 | Aguglia |
| 2004/0041742 A1 | 3/2004 | Fink et al. |
| 2004/0068046 A1 | 4/2004 | Hugo |
| 2005/0064094 A1 | 3/2005 | Wojtysiak et al. |
| 2005/0133082 A1 | 6/2005 | Konold et al. |
| 2005/0152417 A1 | 7/2005 | Lin |
| 2005/0163983 A1 | 7/2005 | Watase et al. |
| 2005/0167612 A1 | 8/2005 | Jaffer |
| 2005/0247337 A1 | 11/2005 | Chen et al. |
| 2005/0274374 A1 | 12/2005 | Boguslavskiy et al. |
| 2006/0076868 A1 | 4/2006 | Pullini et al. |
| 2006/0162762 A1 | 7/2006 | Gilman |
| 2007/0227170 A1 | 10/2007 | Peng |
| 2009/0009856 A1 | 1/2009 | Hasman et al. |
| 2009/0127478 A1 | 5/2009 | Inoue et al. |
| 2009/0128893 A1 | 5/2009 | McCarthy et al. |
| 2009/0183853 A1 | 7/2009 | Chen |
| 2010/0040796 A1 | 2/2010 | Chueh |
| 2010/0155043 A1 | 6/2010 | Smith |
| 2010/0294325 A1 | 11/2010 | Lee et al. |
| 2011/0151507 A1 | 6/2011 | Van et al. |
| 2012/0210736 A1 | 8/2012 | Rockenfeller et al. |
| 2014/0131023 A1 | 5/2014 | Raman et al. |
| 2015/0131146 A1 | 5/2015 | Fan et al. |
| 2015/0132596 A1 | 5/2015 | Yamada et al. |
| 2015/0338175 A1* | 11/2015 | Raman .................... B60H 1/32 165/185 |
| 2016/0362807 A1 | 12/2016 | Casse et al. |
| 2016/0363394 A1 | 12/2016 | Liu et al. |
| 2016/0363396 A1 | 12/2016 | Liu et al. |
| 2017/0248381 A1* | 8/2017 | Yang .................... F28F 21/089 |
| 2017/0314878 A1 | 11/2017 | Raman et al. |
| 2018/0023866 A1 | 1/2018 | Chen et al. |
| 2018/0180331 A1* | 6/2018 | Yu .......................... F24S 70/60 |
| 2018/0244928 A1 | 8/2018 | Van et al. |
| 2019/0017758 A1 | 1/2019 | Raman et al. |
| 2019/0086164 A1* | 3/2019 | Yang .................. B29C 48/9135 |
| 2019/0152410 A1* | 5/2019 | Zhu ......................... B32B 27/06 |
| 2019/0239586 A1 | 8/2019 | Cui et al. |
| 2019/0256717 A1* | 8/2019 | Van Overmeere ... C09D 129/14 |
| 2019/0316854 A1 | 10/2019 | Fain |
| 2019/0391301 A1 | 12/2019 | Takatori et al. |
| 2020/0025425 A1 | 1/2020 | Yu et al. |

FOREIGN PATENT DOCUMENTS

| | | | |
|---|---|---|---|
| CN | 107923718 A | 4/2018 | |
| EP | 3106814 A1 | 12/2016 | |
| EP | 3106815 A1 | 12/2016 | |
| JP | H04230703 A | * 8/1992 | |
| WO | 2010/033082 A1 | 3/2010 | |
| WO | 2017/151514 A1 | 9/2017 | |
| WO | WO-2018180177 A1 | * 10/2018 | .............. F28F 13/18 |

OTHER PUBLICATIONS

3M. "Vikuity™ Enhanced Specular Reflector Film (ESR) Material Safety Data Sheet," 1-5 (Feb. 2006).

A. Burdick, "Strategy guideline: Accurate heating and cooling load calculations," Tech. Rep., U.S. Dept. of Energy: Energy Efficiency and Renewable Energy, httd://www.nrel.dovidocsifyl 1ostif51603 pdf (Jun. 2011).

Angus R. Gentle and Geoff B.Smith "A Subambient Open Roof Surface under the Mid-Summer Sun." Advanced Science 2, Material Views, 1-4 (2015).

Arnold et al., Coherent thermal infrared emission by two-dimensional silicon carbide gratings, Physical Review B 86, 035316, Jul. 2012.

(56) References Cited

OTHER PUBLICATIONS

Eden Rephaeli et al. "Ultrabroadband Photonic Structures To Achieve High-Performance Daytime Radiative Cooling" NANO Letters 13, ACS Publications, American Chemical Society, 1457-1461 (Mar. 5, 2013).

Enze, Xie et al., "Comprehensive Knowledge Manual for Chemical Technicians," Jilin Science and Technology Press, pp. 65, Sep. 30, 1990. {English Translation).

International Search Report and Written Opinion dated Jul. 23, 2020 for International Application No. PCT/US2020/028821, filed Apr. 17, 2020.

International Search Report and Written Opinion of PCT/US2019/068818 dated Apr. 14, 2020.

Marquier et al. Coherent spontaneous emission of light by thermal sources, Physical Review B6 69, 155412,2004.

Peilin, Chen, "Q&A On Air-Conditioning Technology," Tongji University Press, pp. 225-226, May 2003.

R. Farrington and J. Rugh, "Impact of vehicle air-conditioning on fuel economy, tailpipe emissions, and electric vehicle range," Tech. Rep., National Renewable Energy Laboratory, http://www.nrel.dov/docs/KOosti/28960.pdf (2000).

R. Robb, A. Brooker, L. Ramroth, J. Rugh and K. Smith, ""Analysis of off-board powered thermal preconditioning in electric drive vehicles,"" Tech. Rep., National Renewable Energy Laboratory, http://www.nrel.gov/vehiclesandfuels/vsa/pdfs/49252..df (2010).

Zhao, Dongliang et al., "Radiative sky cooling-assisted thermoelectric cooling system for building applications," Energy, Elsevier, vol. 190, Jan. 1, 2020, 116322.

U.S. Appl. No. 18/384,306, filed Oct. 26, 2023, David Urnes Johnson.

Zhao Dongliang et al., "Radiative sky cooling: Fundamental principles, materials, and applications", Applied Physics Reviews, American Institute of Physics, 2 Huntington Quadrangle, Melville, NY 11747, vol. 6, No. 2, Apr. 16, 2019, pp. 1-40.

\* cited by examiner

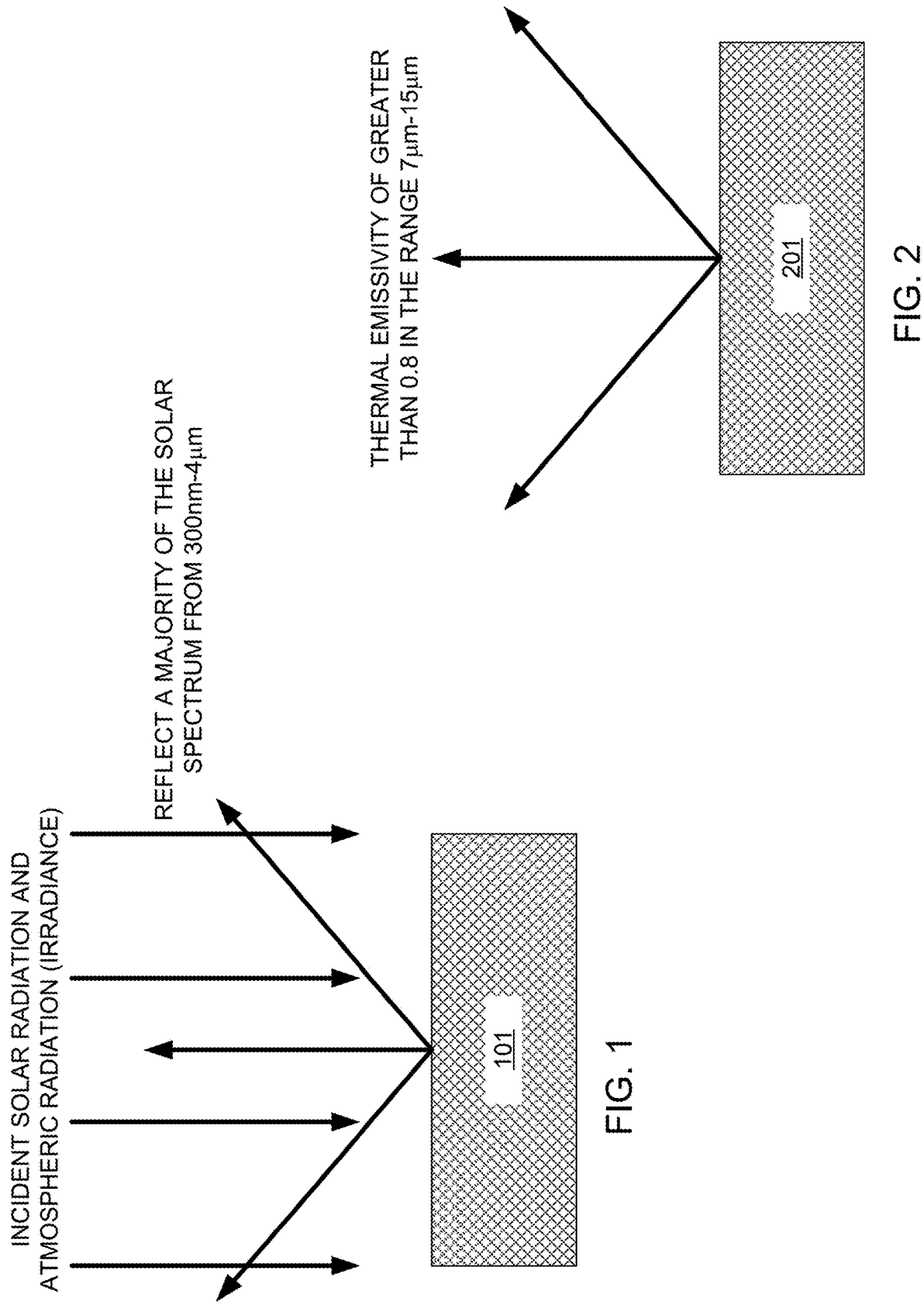

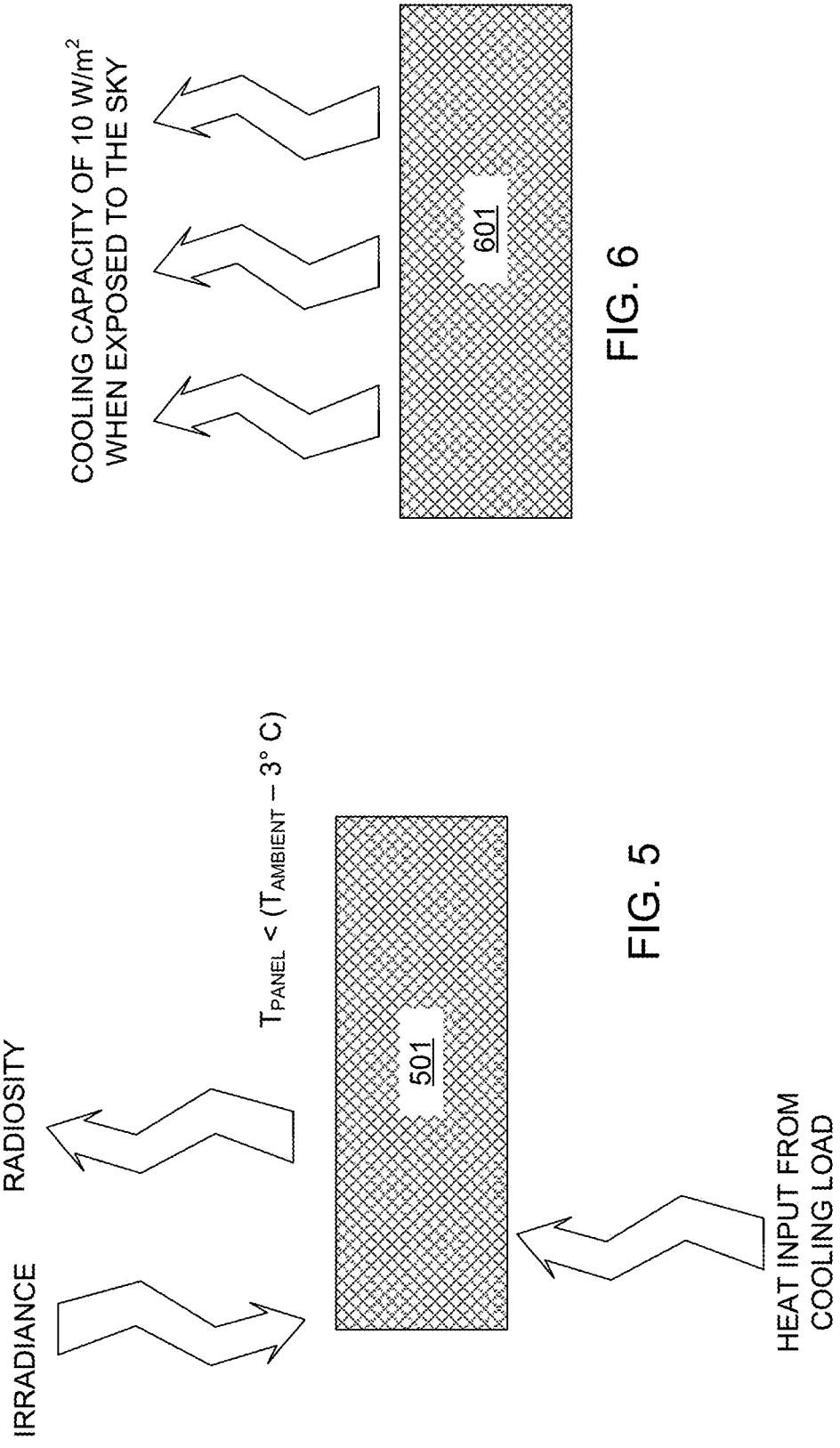

RADIATIVE COOLING SYSTEMS

CROSS REFERENCE TO RELATED APPLICATIONS

This application is a continuation of U.S. patent application Ser. No. 17/747,340, now U.S. Pat. No. 11,841,171, filed May 18, 2022, which is a continuation of U.S. patent application Ser. No. 16/852,132, filed Apr. 17, 2020, now U.S. Pat. No. 11,359,841, filed Apr. 17, 2020, which claims the benefit of U.S. Provisional Patent Application No. 62/835,411 filed Apr. 17, 2019, the disclosures of which are hereby incorporated by reference herein in their entireties.

BACKGROUND

One challenge radiative cooling materials face is their long-term exposure because they are arranged outdoors to enable the radiative cooling effect. For example, durability under both sunlight and weathering conditions poses a central challenge to the effectiveness of a cooling panel.

SUMMARY

The present disclosure is directed to materials, films, cooling panels, and cooling systems. In some embodiments, the present disclosure is directed to a material for radiative cooling that includes one or more constituent materials, an outer surface configured to interact thermally with the atmosphere and with solar radiation, and a thermal emissivity of at least 0.8 in spectral range of 5 μm to 15 μm. The material exhibits strong ultraviolet absorption or reflection in the spectral range of 275 nm to 375 nm. In some embodiments, the material includes an emissivity of at least 0.8 in spectral range of 5 μm to 15 μm, an ultraviolet reflectivity of at least 0.5 in the spectral range of 275 nm to 375 nm, an ultraviolet absorptivity of at least 0.75 in the spectral range of 275 nm to 375 nm, or a combination thereof. For example, in some embodiments, the material includes ZnO, Si, HfO2, ZnO2, or a combination thereof. In some embodiments, the material is capable of achieving a cooling rate of at least 10 W/m2 at 300 K when exposed to the sky at a 300 K ambient air temperature. In some embodiments, the material includes a thickness substantially normal to the outer surface. In some embodiments, the material includes a top layer nearest the outer surface simultaneously provides strong thermal emittance and high UV absorption. In some embodiments, the material includes a top layer nearest the outer surface simultaneously provides strong thermal emittance and high UV reflectance. In some embodiments, the material is capable of reflecting greater than 93% of the weighted solar spectrum from 300 nm to 4 μm in free-space wavelength. In some embodiments, the material includes a plurality of discrete planar layers along a depth dimension. The layers may include a top layer exhibiting thermal emissivity averaged at greater than 0.8 from 7 μm to 15 μm in wavelength, and a lower layer designed to exhibit strong solar spectrum reflection from 300 nm to 4 μm. For example, the material may include an emissivity of at least 0.8 in spectral range of 5 μm to 15 μm, an ultraviolet reflectivity of at least 0.5 in the spectral range of 275 nm to 375 nm, an ultraviolet absorptivity of at least 0.75 in the spectral range of 275 nm to 375 nm, or a combination thereof. In some embodiments, the material is capable of absorbing at least some of the visible spectrum of 400 nm to 900 nm to enable a visual color.

In some embodiments, the present disclosure is directed to a cooling assembly that includes a panel and a heat exchanger. The panel includes one or more constituent materials, and an outer surface configured to interact thermally with the atmosphere and with solar radiation. The panel includes an emissivity of at least 0.8 in spectral range of 5 μm to 15 μm, an ultraviolet reflectivity of at least 0.5 in the spectral range of 275 nm to 375 nm, an ultraviolet absorptivity of at least 0.75 in the spectral range of 275 nm to 375 nm, or a combination thereof. The heat exchanger is affixed to the panel to cool a liquid or gas. In some embodiments, the cooling assembly includes an enclosure configured to insulate the panel to enable cooling to temperatures further than 3° C. below an ambient air temperature. In some embodiments, the cooling assembly is configured to be affixed to a top of a roof to provide durable cooling to an underlying structure or building. In some embodiments, the cooling assembly is configured to be affixed to a road transport vehicle to provide durable cooling to the vehicle while stationary or in motion.

In some embodiments, the present disclosure is direct to a cooling material configured to facilitate thermally-generated emissions that originate from the material with an averaged thermal emissivity of greater than 0.8 in the spectral wavelength range of 7 μm-15 μm, absorb or reflect solar light in the spectral wavelength range of 275 nm to 375 nm to minimize damage due to sunlight, and reflect or absorb at least some of the solar spectrum from 375 nm to 4 μm to enable visual color. In some embodiment, the material includes an emissivity of at least 0.8 in spectral range of 5 μm to 15 μm, an ultraviolet reflectivity of at least 0.5 in the spectral range of 275 nm to 375 nm, an ultraviolet absorptivity of at least 0.75 in the spectral range of 275 nm to 375 nm, or a combination thereof. In some embodiments, the cooling material is configured to be integrated with a heat exchanger to cool a liquid, gas or solid by conductive or convective heat transfer. In some embodiments, the cooling material is configured to cool refrigerant in a vapor-compression cycle. In some embodiments, the cooling material is configured to achieve a cooling rate greater than 10 W/m2 of net heat rejection at an ambient air temperature during the day or night. In some embodiments, the cooling material is configured to cool a building, structure or vehicle by direct thermal contact with the building, structure or vehicle. In some embodiments, the cooling material is configured to enable free convective cooling to cool heat loads from a temperature above an ambient air temperature to the ambient air temperature. In some embodiments, the cooling material is configured to cool a fluid from the outlet of a component 0.5° C. below or further below an inlet temperature.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 1 shows a cross-sectional view of an illustrative cooling panel experiencing incident radiation, and reflecting some of the incident radiation, in accordance with some embodiments of the present disclosure;

FIG. 2 shows a cross-sectional view of an illustrative cooling panel emitting thermal radiation, in accordance with some embodiments of the present disclosure;

FIG. 5 shows a cross-sectional view of an illustrative cooling panel configured to accept a heat input from a cooling load, in accordance with some embodiments of the present disclosure;

FIG. 6 shows a cross-sectional view of an illustrative cooling panel configured to reject 10 W/m2 from a cooling load when the panel is exposed to the sky, in accordance with some embodiments of the present disclosure;

DETAILED DESCRIPTION

The present disclosure is directed to materials and configurations that enable durable radiative cooling that can last a sufficiently long time for real world cooling applications during both daytime and nighttime.

FIG. 1 shows a cross-sectional view of illustrative cooling panel 101 experiencing incident radiation, and reflecting some of the incident radiation, in accordance with some embodiments of the present disclosure. In some embodiments, a material of cooling panel 101 is configured to reflect a majority of the solar spectrum from 300 nm to 4 µm in free-space wavelength. In some embodiments, a material of cooling panel 101 is configured to present average reflectance of at least 0.8 from 300 nm to 4 µm in free-space wavelength.

FIG. 2 shows a cross-sectional view of illustrative cooling panel 201 emitting thermal radiation, in accordance with some embodiments of the present disclosure. In some embodiments, the one or more constituent materials of cooling panel 201 includes a thermal emissivity (e.g., average or effective emissivity) of greater than 0.8 in the spectral range of 7-15 µm in wavelength.

Figure 3:
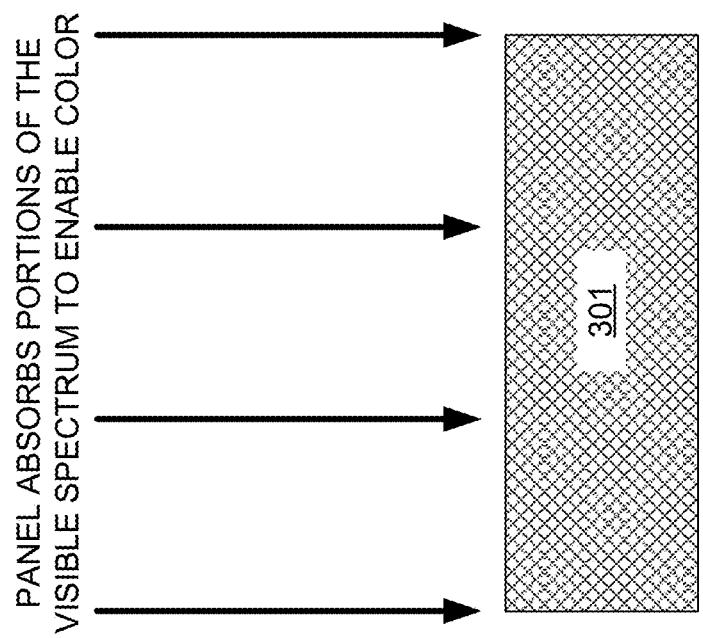
FIG. 3 shows a cross-sectional view of an illustrative cooling panel absorbing incident radiation in the visible spectrum, in accordance with some embodiments of the present disclosure.

FIG. 3 shows a cross-sectional view of illustrative cooling panel 301 absorbing incident radiation in the visible spectrum, in accordance with some embodiments of the present disclosure.

Figure 4:
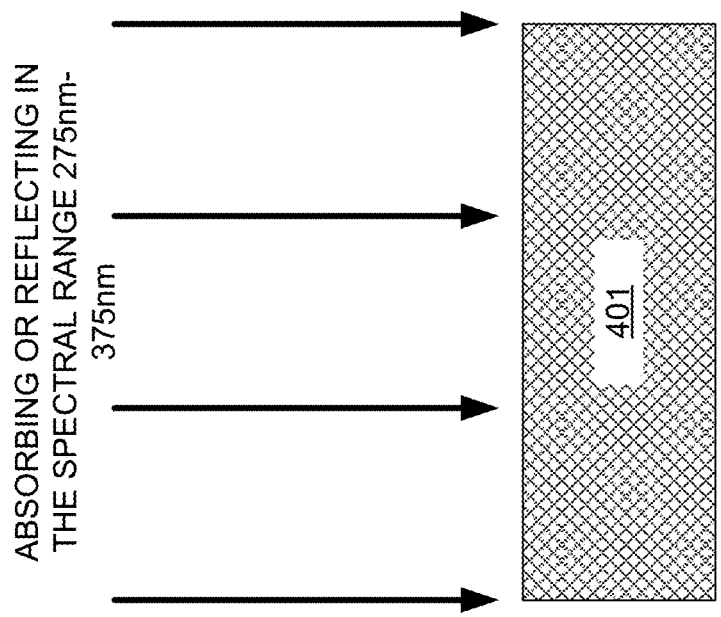
FIG. 4 shows a cross-sectional view of an illustrative cooling panel absorbing or reflecting incident radiation in the spectral range of 275-375 nm, in accordance with some embodiments of the present disclosure.

FIG. 4 shows a cross-sectional view of illustrative cooling panel 401 absorbing or reflecting incident radiation in the spectral range of 275 nm to 375 nm, in accordance with some embodiments of the present disclosure. In some embodiments, the one or more constituent materials of cooling panel 401 reflect at least 10% of solar intensity present in the range of 275 nm to 375 nm. In some embodiments, the one or more constituent materials of cooling panel 401 absorb at least 10% of solar intensity present in the range of 275 nm to 375 nm.

In some embodiments, a radiative cooling material includes one or more constituent materials that are configured to passively cool at a rate of greater than 10 W/m2 at 300 K ambient air temperature when exposed to the sky (e.g., unobstructed by terrestrial structures). In some embodiments, the one or more constituent materials includes a thermal emissivity (e.g., average or effective emissivity) of greater than 0.8 in the spectral range of 7-15 µm in wavelength (e.g., infrared light range) and relatively strong absorption or reflectance in the spectral 275-375 nm (e.g., ultraviolet).

In some embodiments, an outer layer of the material is configured to provide strong thermal emittance, (e.g. greater than an average of 0.8 from 5-15 microns in wavelength range) and high UV absorption (e.g. greater than 0.75 between 300 and 380 nm in wavelength).

In some embodiments, an outer layer is configured to simultaneously provide strong thermal emittance (e.g. greater than an average of 0.85 from 5-15 microns in wavelength range) and high UV reflectance (e.g. greater than 0.75 between 300 and 380 nm in wavelength).

In some embodiments, the material is configured to reflect more than 93% of the weighted solar spectrum from 300 nm to 4 µm in free-space wavelength.

In some embodiments, the material includes discrete planar layers along a depth dimension. The planar layers are arranged with a top layer designed to exhibit strong thermal emissivity (e.g., averaged at greater than 0.8 from 5-15 µm in wavelength), with a lower layer designed to exhibit strong solar spectrum reflection from 300 nm to 4 µm. In some embodiments, the material includes an emissivity of at least 0.8 in spectral range of 5 µm to 15 µm, an ultraviolet reflectivity of at least 0.5 in the spectral range of 275 nm to 375 nm, an ultraviolet absorptivity of at least 0.75 in the spectral range of 275 nm to 375 nm, or a combination thereof.

In some embodiments, the material is configured to absorb at least some portions of the visible spectrum (e.g., 400-900 nm). In some embodiments, the material has average absorption.

In some embodiments, the material is affixed to a heat exchanger configured to cool a fluid (e.g., liquid or gas). FIG. 5 shows a cross-sectional view of illustrative cooling panel 501 configured to accept a heat input from a cooling load, in accordance with some embodiments of the present disclosure. In some embodiments, the material is insulated in an enclosure to enable cooling to temperatures 3° C. below, or further below, an ambient air temperature. FIG. 6 shows a cross-sectional view of illustrative cooling panel 601 configured to reject 10 W/m2 from a cooling load when the panel is exposed to the sky, in accordance with some embodiments of the present disclosure.

In some embodiments, the material is affixed to the top of a roof and configured to provide durable cooling to the underlying structure or building.

In some embodiments, the material is affixed to a road transport vehicle to provide durable cooling to the vehicle while stationary or in motion.

In some embodiments, the present disclosure is directed to achieving radiative cooling using a panel. The panel is configured for facilitating thermally-generated emissions that originate from a surface layer and based on a temperature of the surface layer, with an averaged thermal emissivity greater than 0.8 from 7-15 microns in wavelength of electromagnetic spectra. The panel is configured for absorbing or reflecting incident solar light from 275-375 nm to minimize damage due to sunlight. The panel is configured for reflecting or absorbing the rest of the solar spectrum from 375 nm to 4 microns to enable visual color. To illustrate, the panel may include an emissivity of at least 0.8 in spectral range of 5 μm to 15 μm, an ultraviolet reflectivity of at least 0.5 in the spectral range of 275 nm to 375 nm, an ultraviolet absorptivity of at least 0.75 in the spectral range of 275 nm to 375 nm, or a combination thereof.

Figure 7:
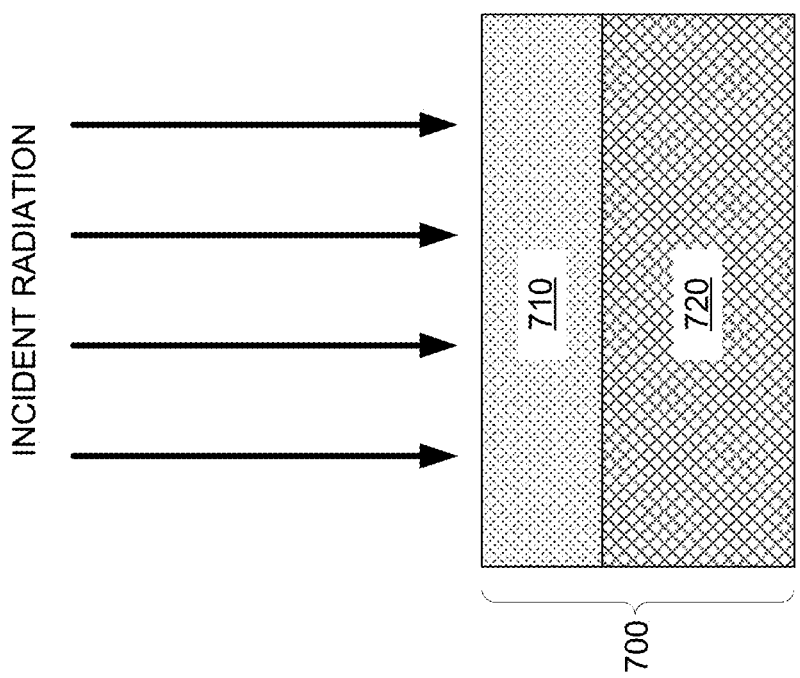
FIG. 7 shows a cross-sectional view of a cooling panel including two layers; a UV absorbing or reflecting layer and a thermally emissive layer, in accordance with some embodiments of the present disclosure.

FIG. 7 shows a cross-sectional view of cooling panel 700 including two layers; a UV absorbing or reflecting layer (e.g., layer 710) and a thermally emissive layer (e.g., layer 720), in accordance with some embodiments of the present disclosure. The UV absorbing or reflecting layer (e.g., layer 710) is configured to prevent UV radiation from reaching the thermally-emissive layer. The thermally emissive layer (e.g., layer 720) is configured to emit thermal radiation in a spectral range that corresponds to the panel temperature. Accordingly, cooling panel 700 shown in FIG. 7 is configured to cool a cooling load when exposed to the sky.

In an illustrative example, layer 710 may include a single material, an ensemble of nanoparticles, an ensemble of microparticles, or a combination thereof to enhance UV reflection, absorption, or both. In a further illustrative example, layer 720 may include one or more suitable materials for radiative cooling (e.g., for thermally emitting, reflecting, or both).

Figure 8:
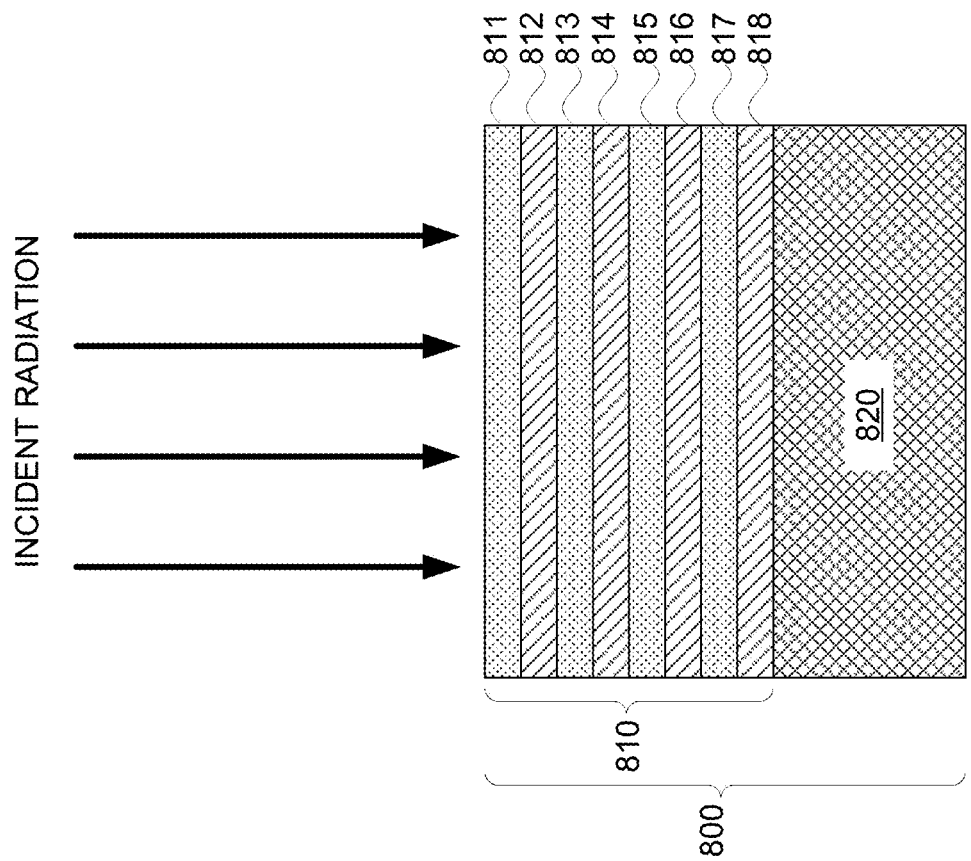
FIG. 8 shows a cross-sectional view of a cooling panel including two layers; a UV absorbing or reflecting composite layer and a thermally emissive layer, in accordance with some embodiments of the present disclosure.

FIG. 8 shows a cross-sectional view of cooling panel 800 including two layers; a UV absorbing or reflecting composite layer (e.g., layer 810) and a thermally emissive layer (e.g., layer 820), in accordance with some embodiments of the present disclosure. Layer 810, as illustrated, includes alternating layers arranged and configured to enhance UV reflection, absorption, or both. Layers 811, 813, 815, and 817 are composed of a first material and layers 812, 814, 816, and 818 are composed of a second material. In an illustrative example, alternating layers of Si and ZnO may be used to form layers 811-818. It will be understood that while layer 810 is illustrated as included eight sublayers (e.g., layers 811-818), any suitable number of materials may be used, arranged in any suitable number of sublayers.

Figure 9:
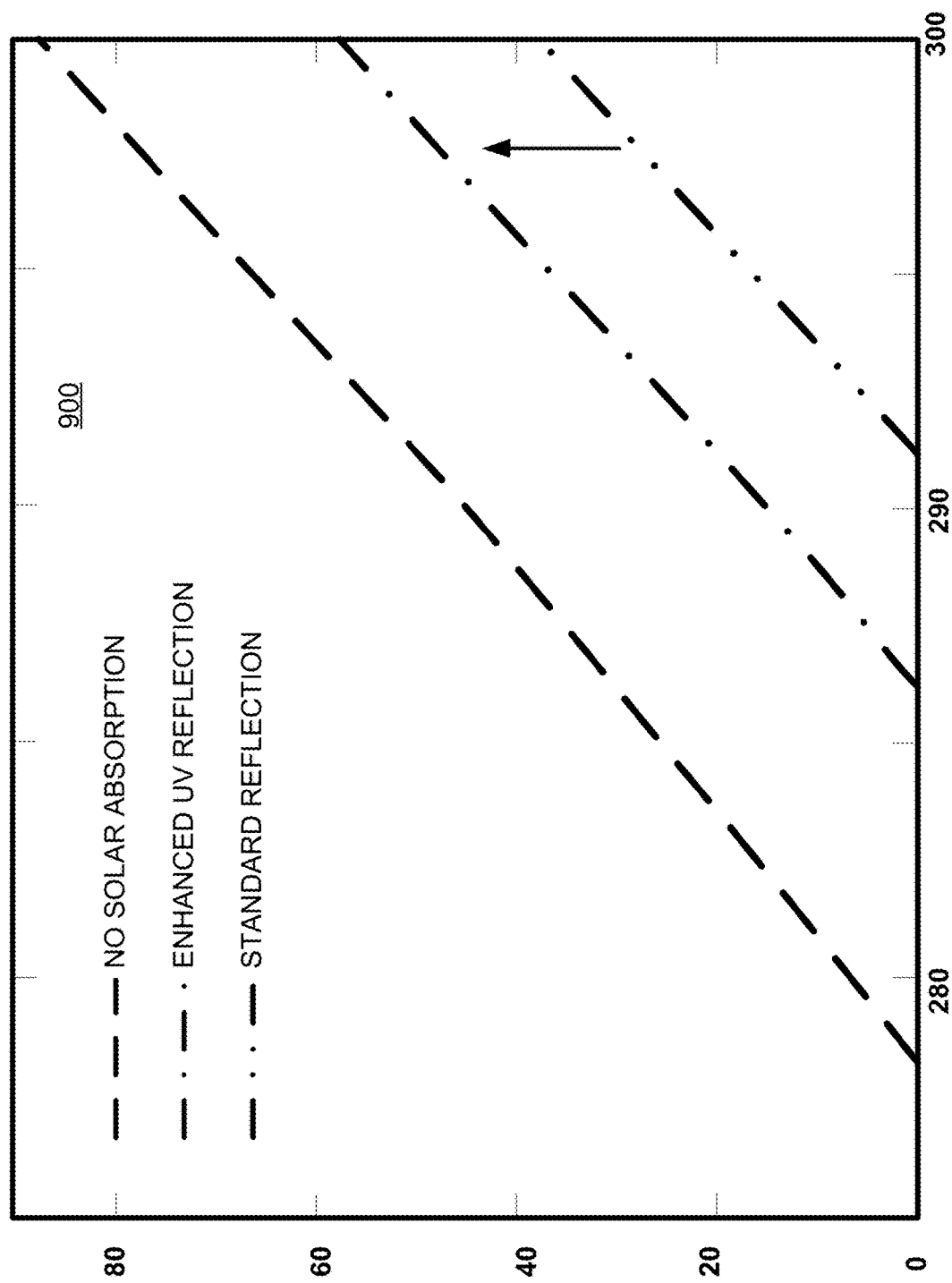
FIG. 9 shows a plot exhibiting several cooling curves, in accordance with some embodiments of the present disclosure.

FIG. 9 shows plot 900 exhibiting several cooling curves, in accordance with some embodiments of the present disclosure. The abscissa of plot 900 is radiative cooler temperature, in units of Kelvin. The ordinate of plot 900 is cooling power, in units of W/m2. As compared to a standard reflector, the enhanced reflectors of the present disclosure allow for increased cooling power, thus causing the cooing curve to trend nearer to the case with no solar absorption.

Figure 10:
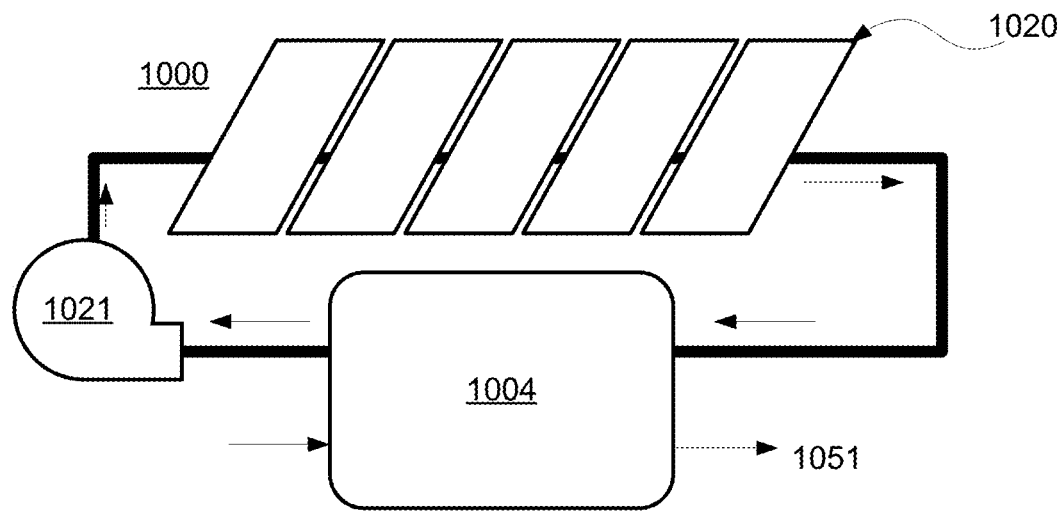
FIG. 10 shows an illustrative configurations of cooling panels and a heat exchanger, in accordance with some embodiments of the present disclosure.

FIG. 10 shows a configurations of cooling panels 1020 and heat exchanger 1004, in accordance with some embodiments of the present disclosure. Illustrative cooling system 1000 includes a cooling loop that includes pump 1021, cooling panels 1020, and passages of heat exchanger 1004. Heat exchanger 1004 allows heat transfer from a stream of fluid pumped (e.g., by pump 1021) through cooling panels 1020 and cooling load 1051 (e.g., which may include a fluid stream).

Figure 11:
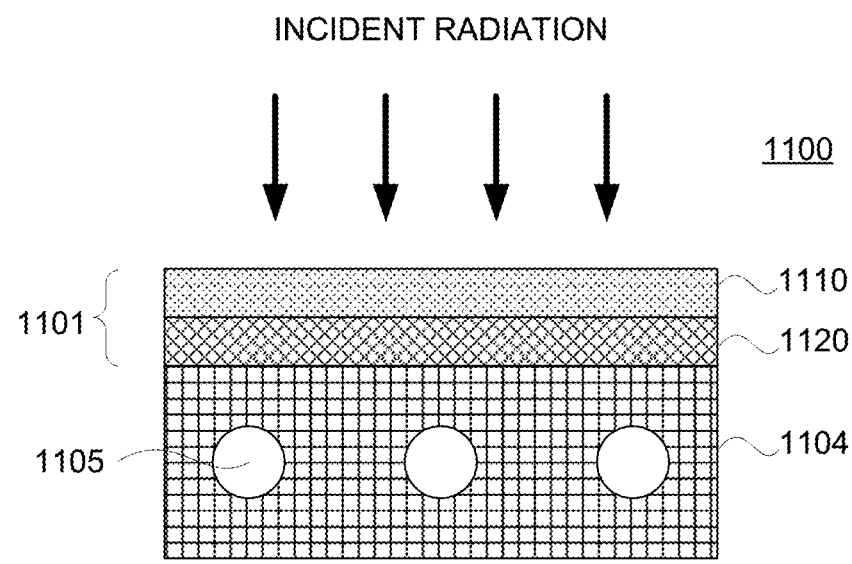
FIG. 11 shows an illustrative configurations of a cooling panel affixed to a heat exchanger, in accordance with some embodiments of the present disclosure.

FIG. 11 shows an illustrative configurations of cooling panel 1101 affixed to heat exchanger 1104, in accordance with some embodiments of the present disclosure. Cooling panel 1101, as illustrated, includes layers 1110 (e.g., a UV absorbing or reflecting layer) and layer 1120 (e.g., a thermally emissive layer). Cooling panel 1101 is affixed to, or otherwise integrated with, heat exchanger 1104, which includes cooling passages 1105 though which a fluid flows. In some embodiments, cooling panel 1101 includes one or more constituent materials. In an illustrative example, cooling panel 1101 may include an outer surface configured to interact thermally with the atmosphere and with solar radiation. Further, the panel may have a thermal emissivity of at least 0.8 in spectral range of 5 μm to 15 μm, with strong ultraviolet absorption or reflection in the spectral range of 275 nm to 375 nm. In some embodiments, an enclosure may be configured to insulate the panel to enable cooling to temperatures further than 3° C. below an ambient air temperature.

In some embodiments, the panel is configured for integrating the panel with a heat exchanger to cool a liquid, gas or solid by conductive or convective heat transfer. For example, the panel may be affixed, bonded, clamped, or otherwise placed in thermal contact with the heat exchanger such that heat is conducted from heat exchanger to the panel.

In some embodiments, the panel is configured for cooling a refrigerant in a vapor-compression cycle. For example, the refrigerant may be passed through a heat exchanger that is in thermal contact with the panel.

In some embodiments, the panel is configured for achieving a cooling rate of greater than 10 W/m2 of net heat rejection at ambient air temperature during both day and night.

In some embodiments, the panel is configured for cooling a building, structure or vehicle by direct thermal contact with the building, structure or vehicle.

In some embodiments, the panel is configured for employing free convective cooling to cool heat loads from above ambient air temperature to the air temperature.

In some embodiments, the panel is configured for cooling a refrigerant or a fluid from the outlet of a condenser or a fluid cooler, respectively, at least 0.5° C. below the entering temperature.

In some embodiments, a separate layer or film is used to add UV absorption or reflection.

In some embodiments, zinc oxide (ZnO) is used for the UV absorption layer. The ZnO may be in nano-particle form, micro-particle form, a thin film, any other suitable form, or any combination thereof.

In some embodiments, multiple (e.g., greater than six) alternating thin layers of Silicon and ZnO are used to create a UV-reflective top film, even though both materials absorb light in the UV range (e.g. 275-375 nm). By using the contrast in refractive index between the two materials, UV reflection is achieved.

In some embodiments, multiple (e.g., greater than four) alternating thin layers of HfO2 and ZnO2 are used to create a UV-reflective top film, even though both materials absorb light in the UV range (e.g. 275-375 nm). By using the contrast in refractive index between the two materials, UV reflection is achieved.

In some embodiments, nanoparticles and microparticles of ZnO are used to reflect UV light (e.g. 275-375 nm) due to their shape as well as their refractive index.

In some embodiments, the UV-reflective or absorbing layers themselves are strongly thermally emissive (e.g. greater than 0.8 average between 5-15 microns).

In some embodiments, the films include diffuse reflectors to prevent light scattering towards objects on the ground or in the surroundings.

In an illustrative example, the material is configured for ultraviolet (UV) reflection and/or absorption to reduce degradation and maintain performance. For example, in some embodiments, the material includes a sequencing of materials such as alternating thin layers of silicon and Zinc oxide to help with UV performance and cooling performance. In a further example, in some embodiments, the material is configured to be resilient to soiling and weathering through micro-structuring of the top surface. The micro-structuring of the surface, in one embodiment a pillar form, enables surface hydrophobicity to allow for water droplets to easily roll off the top layer of the film.

Figure 12:
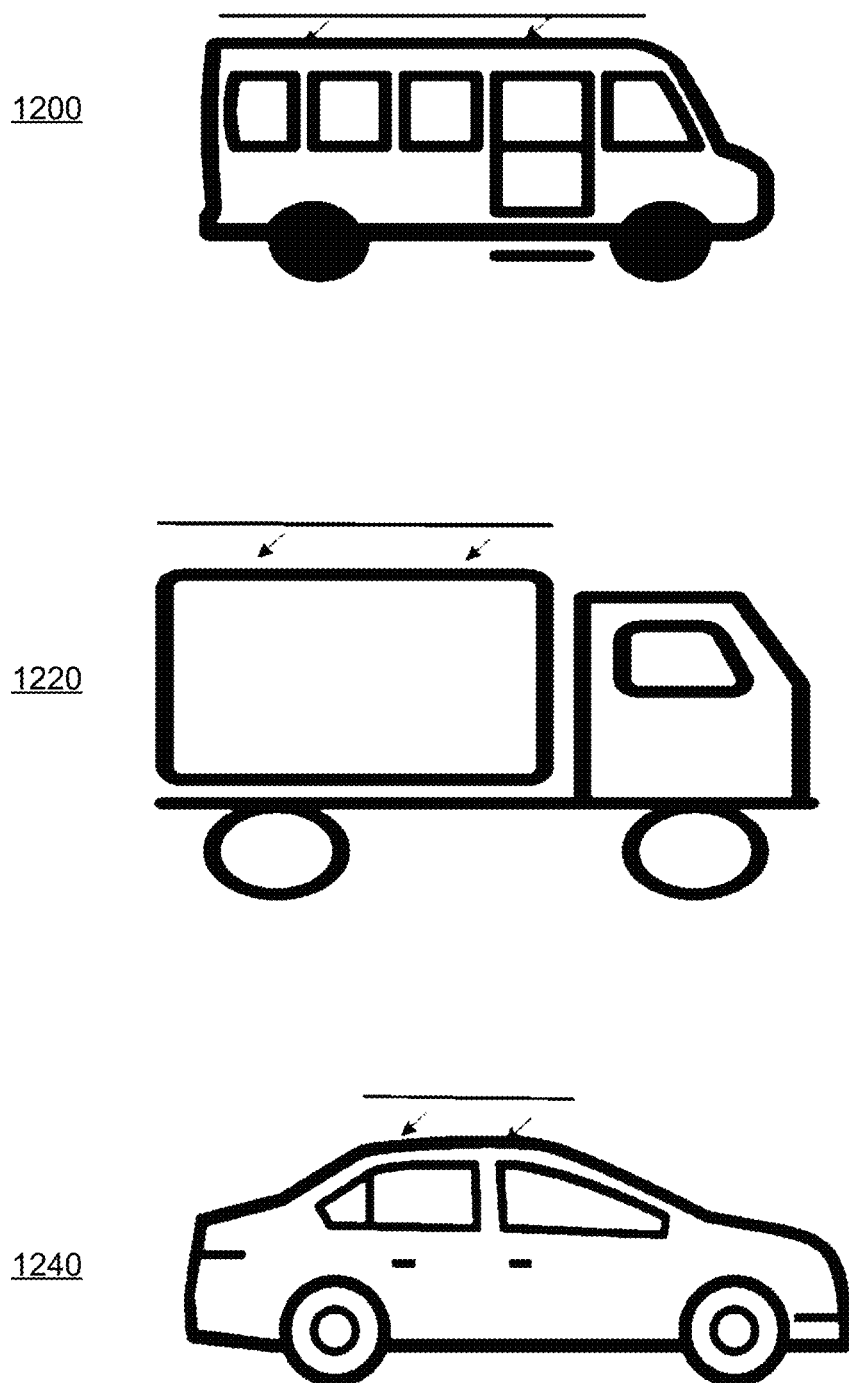
FIG. 12 shows several illustrative configurations of cooling panels affixed to vehicles, in accordance with some embodiments of the present disclosure.

In some embodiments, a material of the present disclosure is used for automotive cooling. FIG. 12 shows illustrative configurations 1200, 1220, and 1240 of cooling panels affixed to vehicles, in accordance with some embodiments of the present disclosure. In some embodiments, the material is affixed to the exterior of a car (e.g., configuration 1240), truck (e.g., configuration 1220), bus (e.g., configuration 1200), windshield covering, temporary covering, any other suitable exterior surface, or any combination thereof. In some embodiments, the material is affixed to the roofs of automobiles, buses or trucks to reduce the solar heat gain coming into the vehicles. The materials could also be used as a temporary covering to reduce the solar heat gain coming in through windows such as the windshield of a vehicle. In some embodiments, the material is affixed to the roof of an automobile. In this form, the film may reduce heat gain of the vehicle thereby reducing the air conditioning load and fuel consumption of the vehicle. To illustrate, the film may be applied directed to the vehicle's exterior, or may be applied on a frame structure (e.g., the cooling panel may be integrated with or affixed to a heat exchanger). In some embodiments, the material is affixed to the roof bed of a truck, which may be, but need not be, climate controlled. For example, a significant number of transport trucks are climate-controlled because they carry perishable goods, pharmaceutical items and other temperature-sensitive commodities. The materials of the present disclosure can be affixed using a pressure sensitive adhesive so that the materials bond easily to the surface that it is attached to. The materials of the present disclosure may be configured to reduce heat gain of the vehicle, thus reducing cooling load and improving fuel consumption. In some embodiments, the material is affixed to the top part of the roof of a bus. For example, the cooling film may be able to reduce the bus's solar heat gain, air conditioning load, fuel consumption, carbon footprint and greenhouse gas emissions.

Figure 13:
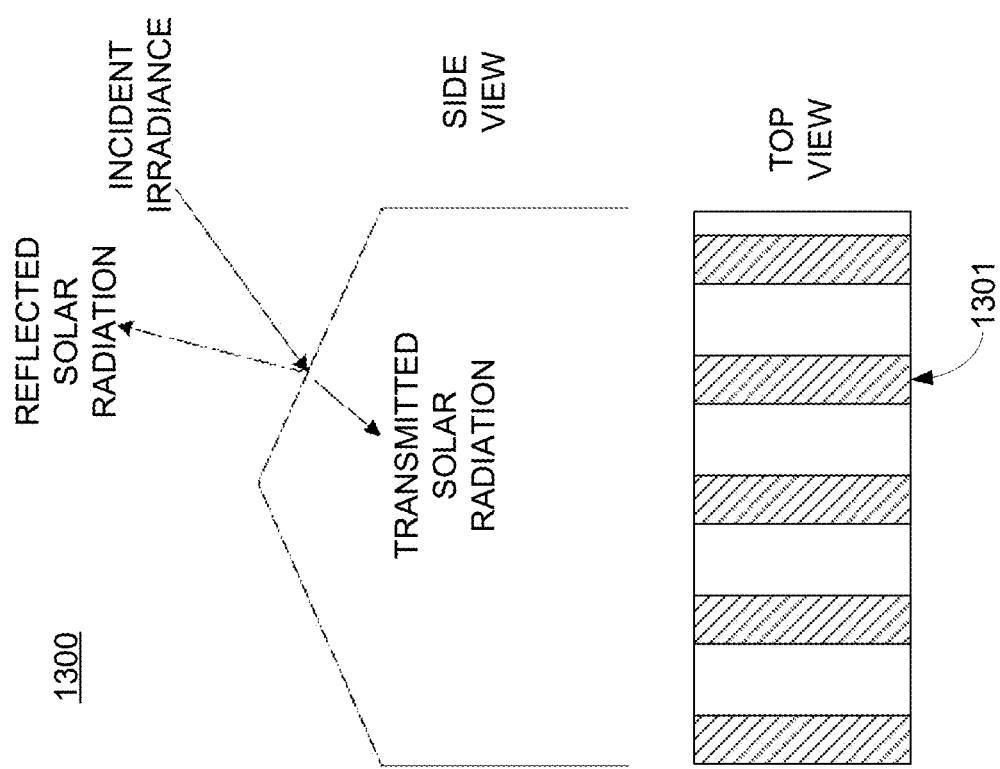
FIG. 13 shows a side view and top view of a greenhouse having illustrative cooling panels affixed to the roof, in accordance with some embodiments of the present disclosure.

FIG. 13 shows a side view and top view of a greenhouse having illustrative cooling panels 1301 affixed to the roof, in accordance with some embodiments of the present disclosure. In some embodiments, the cooling film may be applied directly to glass facades on greenhouse structures. For example, the film may be cut into strips or other suitable pieces to allow some light to come through the glass. The film would reflect other light out and also cool the glass it is in contact with.

Figure 14:
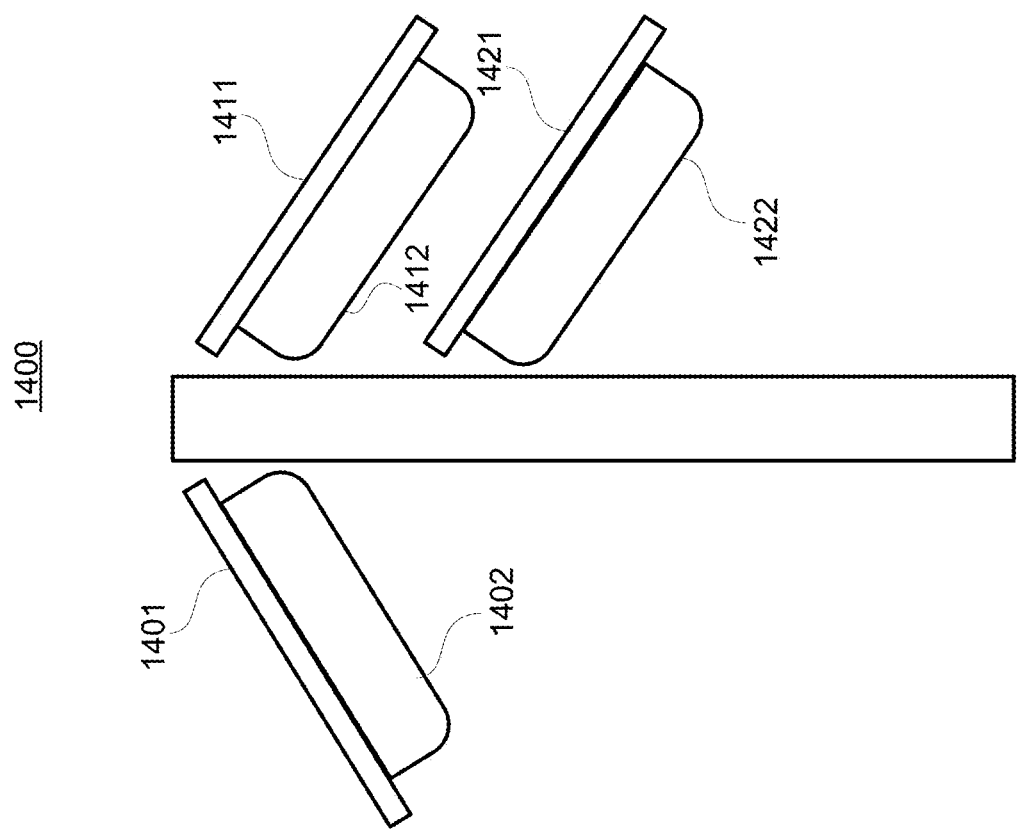
FIG. 14 shows a side view of an electrical system having illustrative cooling panels affixed to electrical cabinets, in accordance with some embodiments of the present disclosure.

FIG. 14 shows a side view of electrical system 1400 having illustrative cooling panels 1401, 1411, and 1421 affixed to respective electrical cabinets 1402, 1412, and 1422, in accordance with some embodiments of the present disclosure. In some embodiments, a material of the present disclosure is used for electronics cooling (e.g., electronic cabinets, other housing of outdoor electronic equipment, batteries). In some embodiments, a cooling film is used as an exterior surface to augment heat rejection of passive convective surfaces. Such surfaces may be found in, for example, cell phone tower equipment, outdoor power electronics, solar inverters, electrical cabinets, transformers and battery storage systems. The cooling film may be used to replace fins or could otherwise enhance the performance of fins to allow for higher energy density electronics to be deployed per outdoor case. The cooling film may be configured to reduce solar heat gain to external cabinets, enhancing the amount of cooling possible by outdoor surfaces. In some embodiments, the cooling film may be combined with thermal storage to ensure that the cabinets never go above a preset internal temperature of 40° C. For example, such cabinets would require zero electricity for cooling and cooling would be completely passive. In some embodiments, the surface may be tilted to ensure that dirt does not accumulate on the film.

Figure 15:
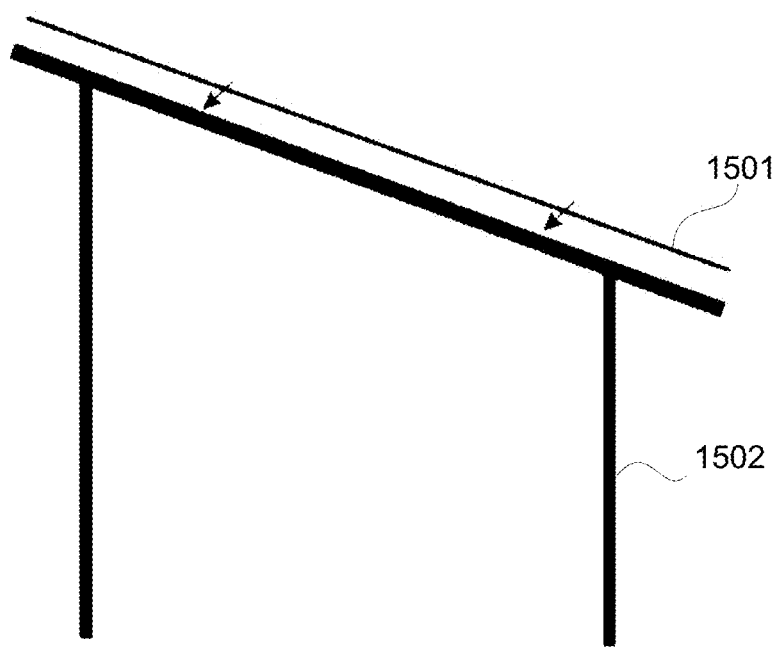
FIG. 15 shows a side view of an outdoor structure having illustrative cooling panels affixed to a roof, in accordance with some embodiments of the present disclosure.

FIG. 15 shows a side view of outdoor structure 1502 having illustrative cooling panel 1501 affixed to a roof, in accordance with some embodiments of the present disclosure. In some embodiments, a material of the present disclosure is used for outdoor shade cooling of a structure (e.g., applied to an outdoor shade structure such as bus shelter or canopy). In some embodiments, the material or cooling panels including the material is affixed to the sky-facing part of a shade structure such as, for example, a bus shelter or a canopy. In an illustrative example, the material may be applied directly to the structure during manufacturing of the structure or canopy. In a further example, the material may be applied once the structure has been built and deployed. The cooling film provides passive cooling to the shade structure, thus reducing solar gains and an urban heat island effect of shade structures by reflecting sunlight and radiating heat to the sky.

In some embodiments, the material of the present disclosure, or films thereof, may be applied to curved surfaces, rough surfaces, or otherwise suitably non-planar surfaces. For example, a cooling film may be applied to flat and simply curved surfaces. The cooling film exhibits the most cooling when angled directly towards the sky. In some circumstances, however, the film may be angled slightly away from the sky while still maintaining performance (e.g., high reflectivity and emissivity). For example, one side of the film may include a pressure sensitive adhesive that allows the film to be applied easily to surfaces.

Figure 16:
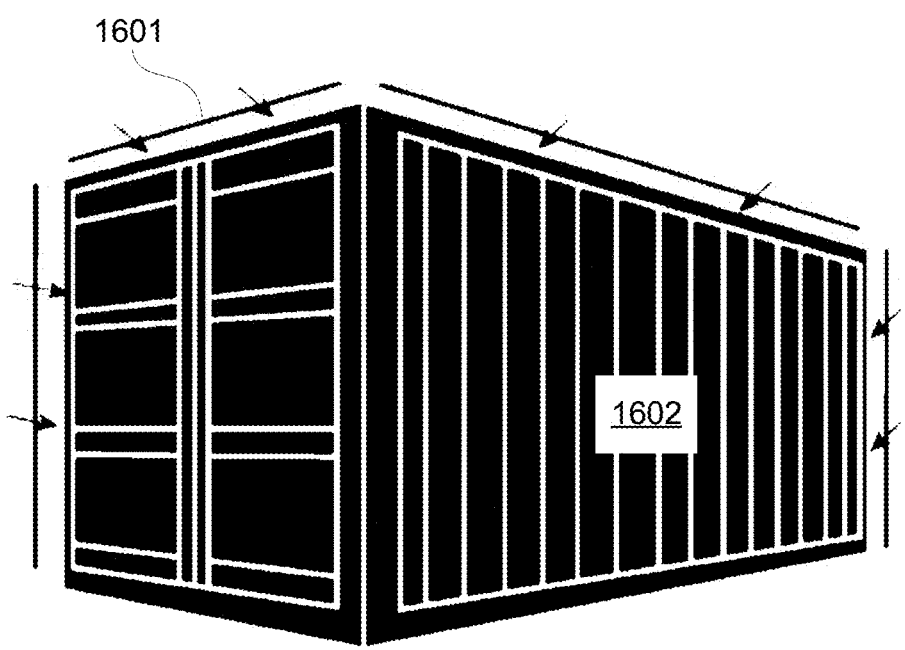
FIG. 16 shows a side view of a containerized living unit having illustrative cooling panels affixed to the exterior, in accordance with some embodiments of the present disclosure.

FIG. 16 shows a side view of containerized living unit 1602 having illustrative cooling panels 1601 affixed to the exterior of containerized living unit 1602, in accordance with some embodiments of the present disclosure. In some embodiments, a material of the present disclosure is used for cooling modular spaces (e.g., a containerized living unit (CLU), mobile home, trailer, temporary storage facility). In some embodiments, the material is affixed to an outward-facing portion (e.g., a steel portion) of the structure. Examples of structures include container living units, mobile homes, mobile bathrooms, trailers and temporary storage facilities. To illustrate, shipping container housing is becoming increasingly popular for both military and civilian use. When applied to the steel surface, the cooling film may provide cooling to the underlying structure of the CLU. Cooling is accomplished by reflecting 95% or more of incident sunlight and emitting infrared light to the sky to reject heat from the CLU. To provide additional cooling, the cooling film may also be applied to the outward facing sides of the CLU. By applying the cooling film to passively cool the CLU, the CLU may be able to reduce the use of other forms of energy, such as diesel fuel, to provide cooling in hot and/or dry climates.

Figure 17:
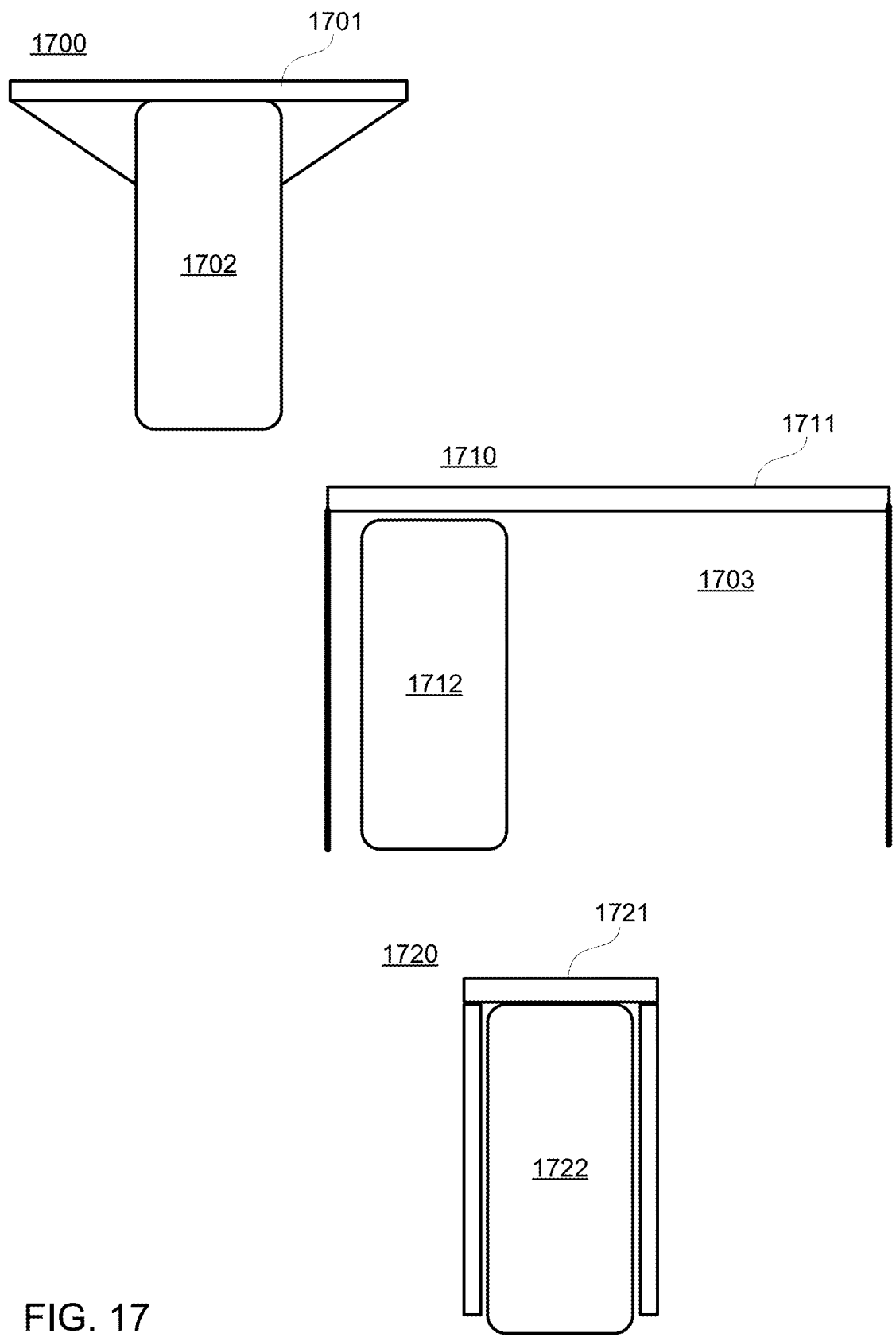
FIG. 17 shows several configurations of cooling panels used to cool aspects of a vending machine, in accordance with some embodiments of the present disclosure.

FIG. 17 shows configurations 1700, 1710, and 1720 of cooling panels used to cool aspects of a vending machine, in accordance with some embodiments of the present disclosure. Configuration 1700 shows cooling panels 1701 arranged as a condenser for vending machine 1702. Cooling panels 1701 may be affixed to a heat exchanger or coupled to a heat exchanger via plumbing, in order to cool a fluid of vending machine 1702. Configuration 1710 shows cooling panels 1711 arranged as a roof structure (or otherwise affixed to a roof structure) and condenser for vending machine 1712 (e.g., with occupant region 1713). Cooling panels 1711 may be affixed to a heat exchanger or coupled to a heat exchanger via plumbing, in order to cool a fluid of vending machine 1712. In some embodiments, a material of the present disclosure is used for refrigerated vending system cooling (e.g., applied to outdoor refrigerated vending machines). In some embodiments, the cooling film may be included in panels used as a condenser to outdoor vending machines. For example, the outdoor vending machines may have some refrigeration capabilities used to keep drinks or food cool. In some embodiments, the panels may be used with or combined with a shade structure for both people and the vending machine. In some embodiments, a refrigerant could flow directly through the panels and in other embodiments, a secondary fluid loop would exist to cool refrigerant in the unit.

Figure 18:
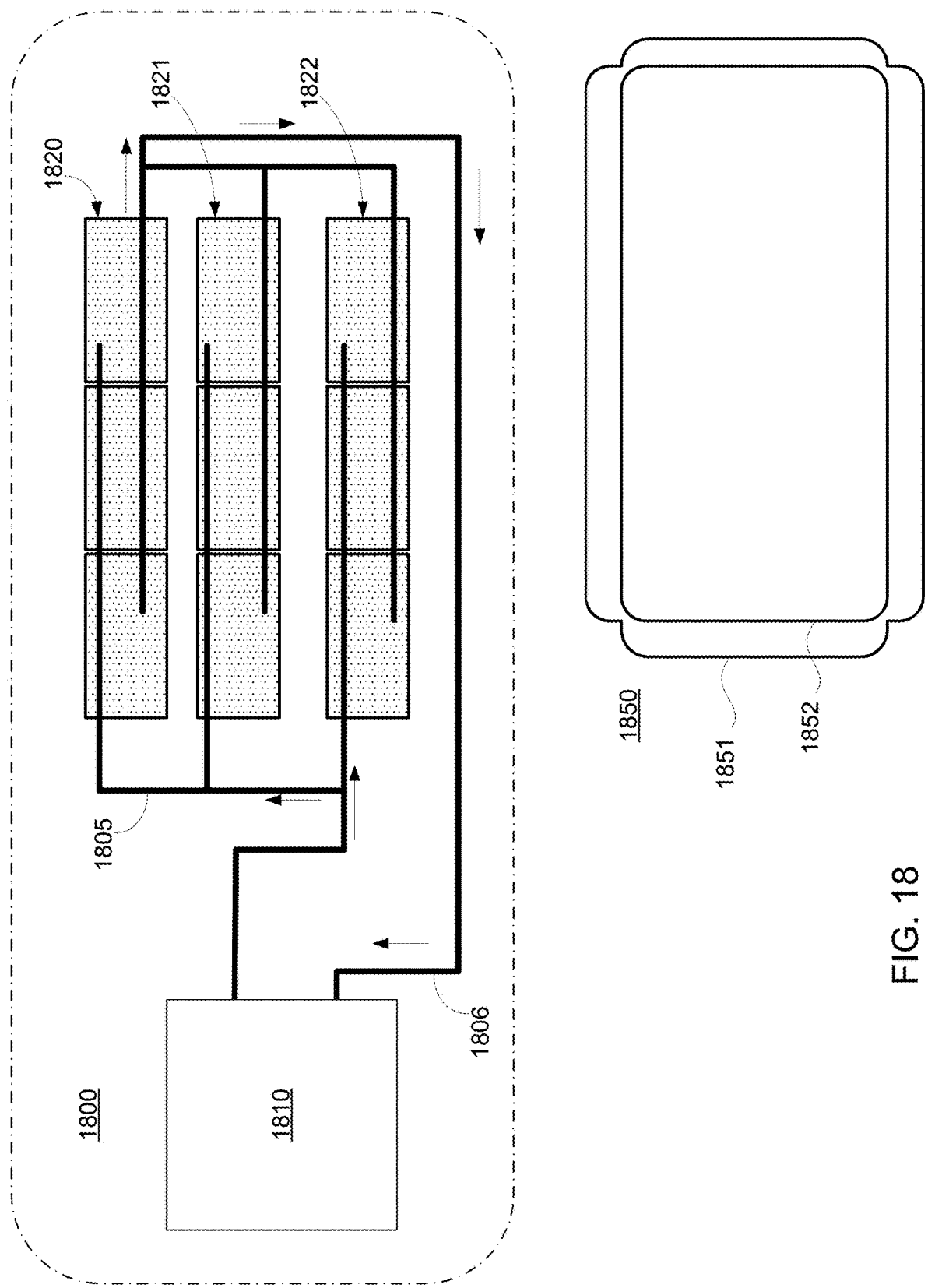
FIG. 18 shows two illustrative configurations of cooling panels used to cool aspects of a swimming pool, in accordance with some embodiments of the present disclosure.

FIG. 18 shows two illustrative configurations of cooling panels used to cool aspects of a swimming pool, in accordance with some embodiments of the present disclosure. In some embodiments, cooling system 1800 may include cooling panel arrays 1820, 1821, and 1822 coupled to fluid conduits 1805 and 1806. In some embodiments, cooling system 1800 may include a pump to aid in moving fluid though conduits 1805 and 1806. Cooling system 1800 may be sized based on a thermal load (e.g., swimming pool 1010). For example, as illustrated, cooling system 1800 includes three cooling panel arrays (e.g., cooling panel arrays 1820, 1821, and 1822), but could optionally include one, two, three, or more than three cooling panel arrays. Fluid conduits 1805 and 1806, as illustrated, are coupled to passages of cooling panel arrays 1820, 1821, and 1822, which are arranged in parallel. In some embodiments, not illustrated, cooling system 1800 may include thermal storage, multiple pumps, flow control valves, sensors (e.g., to sense pressure, temperature, or differences thereof), bypass flow paths, de-aerators, fill ports, fluid-compatible fittings (e.g., of any suitable type), manifolds, distribution blocks, any other components not illustrated in FIG. 18, or any combination thereof. Configuration 1850 includes pool cover 1851, which includes a cooling film in accordance with present disclosure, arranged over pool 1852 to provide cooling during the day, night, or both. In some embodiments, a material of the present disclosure is used for pool cooling. In some embodiments, panels including a cooling film may be used (e.g., in an open loop) to directly cool water contained in a swimming pool. For example, the system may include a pump, strainer, and nominally 2 m2 to 3 m2 of panel for every 100 gal of water in the pool. In some embodiments, the cooling film would be applied as a cover to the pool to prevent the pool from absorbing heat from the sun (e.g., in the middle of the day) and also cooling the pool during the day and at night by emitting infrared heat.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A radiative cooling material that, under direct solar irradiation, comprises:
   an average thermal emissivity greater than 0.85 in a spectral range of 5 µm to 15 µm; and
   an average reflectance of at least 0.8 in a spectral range of 0.3 µm to 4 µm.

2. The radiative cooling material of claim 1, further comprising a UV absorptivity of at least 0.75 in a spectral range of 0.275 µm to 0.375 µm.

3. The radiative cooling material of claim 1, wherein the average reflectance is greater than 0.93 in the spectral range of 0.3 µm to 4 µm.

4. The radiative cooling material of claim 1, wherein the radiative cooling material comprises a plurality of layers, and wherein at least one layer of the plurality of layers provides the average reflectance greater than 0.8 in the spectral range of 0.3 µm to 4 µm.

5. The radiative cooling material of claim 1, wherein the radiative cooling material comprises a plurality of layers, and wherein at least one layer of the plurality of layers comprises an ensemble of particles configured to provide the average reflectance greater than 0.8 in the spectral range of 0.3 µm to 4 µm.

6. The radiative cooling material of claim 1, further comprising a radiative cooling rate of greater than 10 W/m2 of net heat rejection.

7. The radiative cooling material of claim 1, further comprising at least one diffuse reflector to prevent light scattering.

8. The radiative cooling material of claim 1, wherein a top surface of the radiative cooling material is configured to be resilient to soiling and weathering.

9. The radiative cooling material of claim 8, wherein the top surface comprises micro-structuring.

10. The radiative cooling material of claim 8, wherein the top surface is hydrophobic.

11. A cooling panel comprising:
an outer surface configured to interact thermally with an atmosphere and with solar radiation; and
a radiative cooling material that causes the cooling panel to comprise:
an average thermal emissivity greater than 0.85 in a spectral range of 5 µm to 15 µm, and
an average reflectance of at least 0.8 in a spectral range of 0.3 µm to 4 µm.

12. The cooling panel of claim 11, wherein the radiative cooling material causes the cooling panel to further comprise a UV absorptivity of at least 0.75 in a spectral range of 0.275 µm to 0.375 µm.

13. The cooling panel of claim 11, wherein the radiative cooling material comprises a plurality of layers, and wherein at least one layer of the plurality of layers provides the average reflectance greater than 0.8 in the spectral range of 0.3 µm to 4 µm.

14. The cooling panel of claim 11, wherein the radiative cooling material comprises a plurality of layers, and wherein at least one layer of the plurality of layers comprises an ensemble of particles configured to provide the average reflectance greater than 0.8 in the spectral range of 0.3 µm to 4 µm.

15. The cooling panel of claim 11, wherein the radiative cooling material causes the cooling panel to further comprise a radiative cooling rate of greater than 10 W/m2 of net heat rejection.

16. The cooling panel of claim 11, further comprising at least one diffuse reflector to prevent light scattering.

17. The cooling panel of claim 11, wherein a top surface of the cooling panel is configured to be resilient to soiling and weathering.

18. The cooling panel of claim 17, wherein the top surface comprises micro-structuring.

19. The cooling panel of claim 17, wherein the top surface is hydrophobic.

20. A cooling system comprising:
a radiative cooling material affixed to a heat exchanger, wherein under direct solar irradiation, the radiative cooling material comprises:
an average thermal emissivity greater than 0.85 in a spectral range of 5 µm to 15 µm, and
an average reflectance of at least 0.8 in a spectral range of 0.3 µm to 4 µm; and
the heat exchanger, wherein the heat exchanger is configured to cool a fluid based on a cooling power of the radiative cooling material.

* * * * *